Dec. 14, 1954 R. FONJALLAZ 2,696,724
CLOTHES POUNDER
Filed July 11, 1950 2 Sheets-Sheet 1
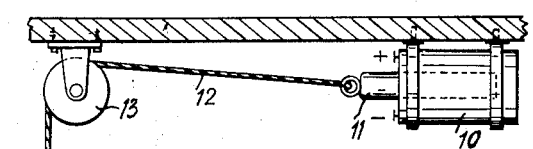
Fig.1 Fig.2
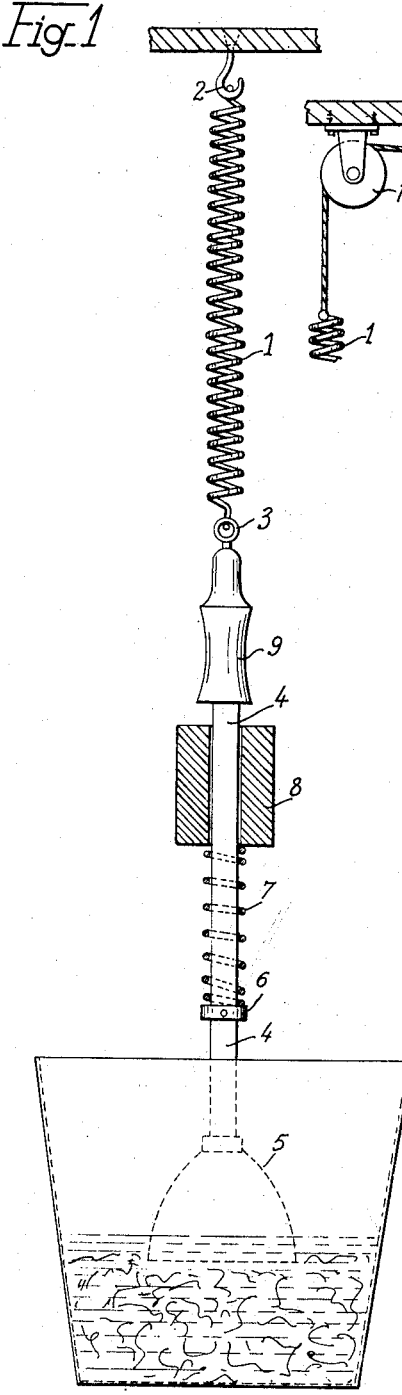
Inventor
Roger Fonjallaz

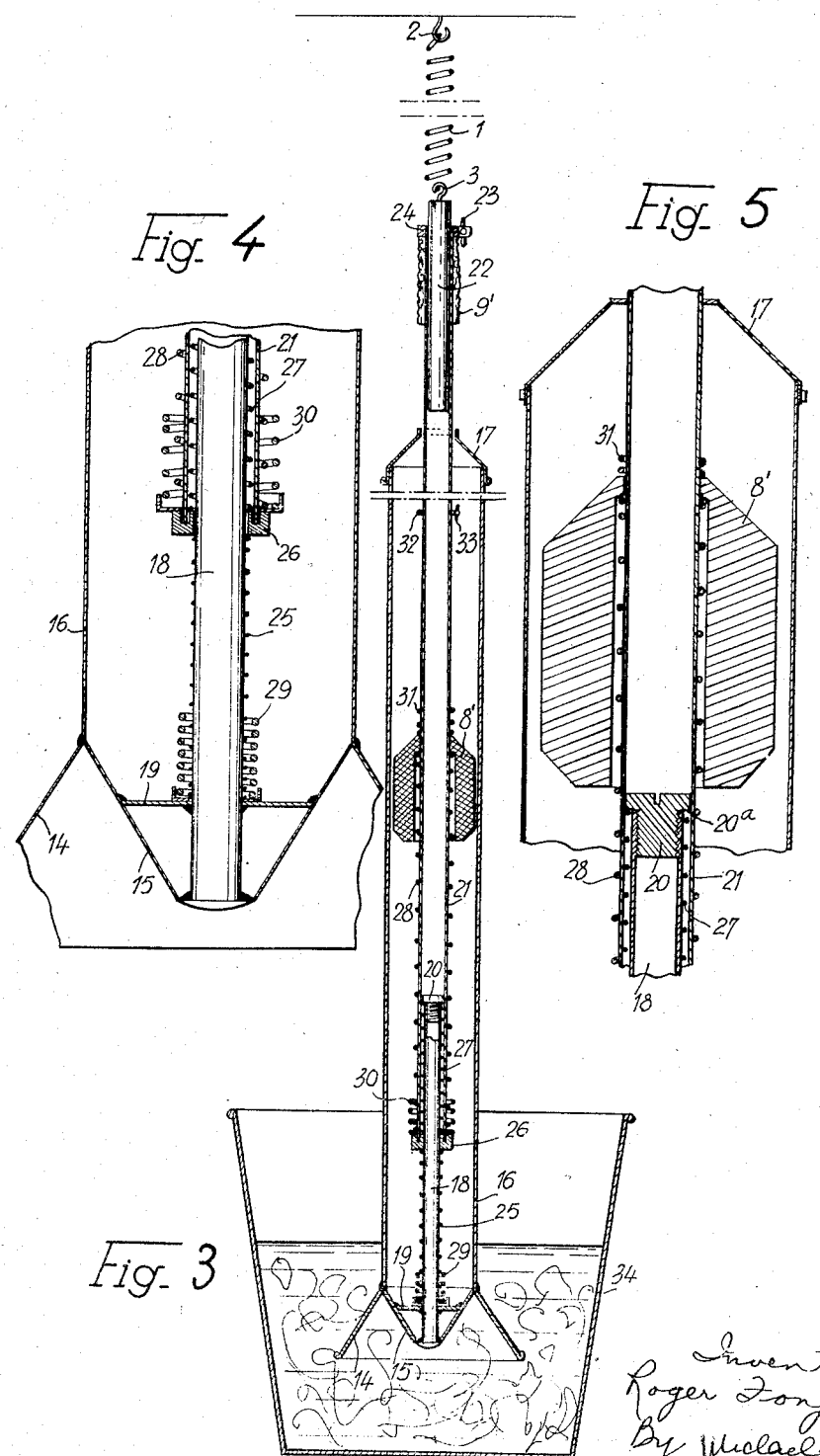

United States Patent Office 2,696,724
Patented Dec. 14, 1954

2,696,724

CLOTHES POUNDER

Roger Fonjallaz, Paris, France

Application July 11, 1950, Serial No. 173,105

Claims priority, application France July 13, 1949

7 Claims. (Cl. 68—216)

For manual washing of linen, metallic or plastic suction bells are used, these bells being fixed at the end of a handle and the linens being washed by agitation of the bell. The soapy water is first moved downwardly by the suction bell, and then during the reverse motion, it is drawn in together with the parts of the linen. This washing process gives excellent results. On the other hand, the handling of this apparatus is tiring for the operator, especially pulling the suction bell upwardly against the effect of the vacuum created inside, during the performance of this operation.

The present invention has for its particular object a new apparatus which remedies the aforementioned drawbacks and which permits operation of the suction bell with the least possible effort.

The invention has furthermore for its object an improved apparatus which facilitates the handling and increases the efficiency of the washing device, and thus divides the forces necessary for the actuation of the suction bell in such a way that the said forces may be synchronized with the oscillatory motion of an accumulating power mass which works like a sway-beam mechanism.

Other characteristics, objects and advantages of the invention will appear in the following description which, in connection with the appended drawings, is given by way of non-limitative examples.

Fig. 1 is an elevational view of a washing apparatus according to the invention.

Fig. 2 is a fragmentary view of a synchronous moving device to be used with the structure of Fig. 1.

Fig. 3 is a diagrammatic elevational cross-section of an improved device.

Figs. 4 and 5 are diagrammatic fragmentary cross-sections on a larger scale of parts of the structure of Fig. 3.

In the embodiment represented in Fig. 1, the spring 1 is hung from the ceiling by means of a hook 2 and its lower end is connected to the ring 3 of the handle 4, provided with another handle 9 and carrying the bell 5. To said handle 4 is attached a collar 6 on which rests the spring 7 which is subjected to the action of the accumulating power mass 8 which can slide along handle 4. The bell 5 plunges into the soapy liquid contained in the wash-boiler in which the linen mass to be washed is located.

The device works as follows:

While holding the handle 9, the operator imparts to the whole system, described above, an alternating up and down motion. During the first motion, the spring 1 expands and the bell 5 penetrates into the linen mass. Due to the fact that it encounters a certain resistance, the descending speed is thus braked. Under the action of the acquired speed which is subjected to said braking, the accumulating power mass 8 compresses the spring 7 in order to increase the penetrating force of the friction bell 5 into the linen mass, which is necessary when the compression of the linen reaches its maximum. Then the spring 1 contracts and the spring 7 brings the accumulating power mass 8 back to its initial position. The operation starts again and one obtains thus the rhythmical motion which is necessary for the working of the suction bell.

In order to bring the whole apparatus back towards the top, one may use an alternative structure (see Fig. 2) involving an electromagnet 10 having a moving core 11. The electromagnet acts either on the spring 1, as shown on the drawing, or on the handle 3, or directly on the accumulating power mass 8. The spring 1 may be fastened to the cable 12 which passes on a grooved pulley 13 and is connected with the core 11. The electromagnet can be controlled by a switch placed on the handle 9 which permits an electric circuit through the magnet to be closed when the suction bell must be brought back towards the top. One can also use a movable and adjustable friction contact which drives the electromagnet when required.

Both types of apparatus as described above can be improved according to the present invention in the manner shown in Figs. 3, 4 and 5, said improvements rendering the apparatus more efficient and decreasing to a great extent the effort required of the operator.

The apparatus shown on Fig. 3 is provided with a suction bell which is constituted by a frustum of cone 14 inside which is inserted an inverted cone 15. These elements are welded along a common line on a guard-tube 16 which is preferably cylindrical and which is provided at its upper end with a cap 17 which has the shape of a truncated cone and which is screwed on said guard-tube 16.

On the apex of the cone 15 is welded a rod 18 which is coaxial with the guard-tube 16. The stability of said rod is ensured by a small plate 19 which is welded both on said rod and on the cone 15. The rod 18 is provided at its upper end with a threaded part on which is screwed a plug 20 which is provided with a circular shoulder 20a (Fig. 5).

The rod 18 can slide axially inside the control tube 21 to which the motive motion is applied. Said driving tube 21 extends outside the guard-tube 16 in relation to which it can slide.

A handle 9' can be provided for grasping the driving tube. The latter is split at its upper end so as to permit a bolt-plug 22 in tube 21 to be tightly gripped with a wing screw 23 carried by a clamping collar 24. The bolt-plug 22 is connected to spring 1 by any appropriate means.

From the foregoing description it is apparent that the suction bell 14—15 is connected to the spring 1 by means of telescoped elements 18—21 and driven in its displacement by the action of elements 17—21. The elastic connection is ensured by springs which are inserted between said elements as follows: the spring 25 which is inserted between the small plate 19 on the one hand and the base 26 which is integral with the lower part of the driving tube 21, on the other hand; the spring 27 is inserted between the shoulder 20a and the base 26 (i. e. between the rod 18 and the driving tube 21). Beside the guiding mechanism constituted by the elements 18—21, other guiding contacts are made between the parts 20—21 and 18—26.

Around the driving tube 21 is arranged a sliding coaxial mass 8'. Between said mass 8' and the base 26 of the tube 21 is inserted a spring 28. The inner part of said mass is suitably hollowed out in order to allow for the housing of said spring 28.

According to the present invention, end-of-stroke damping springs are provided between the various movable parts of the apparatus. A damping spring 29 is placed at the lower end of the rod 18 which bears against the base 26; finally a third damping spring 31 is placed freely at the upper portion of the accumulating power mass 8'. A collar 32 locked on the driving tube 21 by means of a wing screw 33 controls the raising of the mass 8' with respect to said tube 21.

The operation of the apparatus according to the invention is as follows:

While holding handle 9' of the driving tube 21, the operator plunges with an alternating motion the suction bell into the container 34 without reaching the bottom of said container and stopping only when the operator starts feeling a certain resistance and then withdraws the suction bell from the water until it is several centimeters over the level of the liquid contained in the container.

After a certain number of operations which are necessary to catch the rhythm which should be maintained during the washing operation, the operator reaches the period of oscillation of the system which works like a sway-beam mechanism.

The effort of the operator consists in giving a descending vertical impulse when plunging the suction bell and eventually a vertical upward impulse when removing the suction bell. When the operator gives a descending vertical impulse, the base 26 compresses the spring 25 which, upon being compressed, drives the suction bell in. When the suction bell is braked on account of the resistance provided by the liquid and by the linen, the mass 8' compresses the spring 28, which, bearing against the base 26, gives a complementary impulse which thus facilitates the driving in of the suction bell at the moment when the spring 1, being expanded to the utmost, would produce a reverse effect. In maximum sinking position, the mass 8' compresses the damping spring 30, and the base 26 compresses the damping spring 29. Therefore, the mass 8' and the tube 21 are thrown upwardly, the tube 21 being assisted by the vertical upward motion of the operator. The tube 21 therefore rises quicker than the guard-tube 16 whose movement is braked by the liquid and the linen. On account of this unequal upward speed, the spring 27 drives the rod 18 due to the action of the spring which bears against and underneath the shoulder 20a. The guard-tube 16 is simultaneously pushed towards the top and the spring 27 slackens when the suction bell is completely withdrawn from the liquid.

The mass 8' continues its upward motion till the damping spring 31 abuts against the collar 32. The shock which is felt by the hand indicates that the succeeding vertical downward impulse should take place. The power mass 8' is directed towards the bottom at the beginning of htis operation.

This rhythm can be easily maintained. The operator gets used to the motions and fatigue is thus decreased considerably.

It is of course understood that without departing from the principle of the invention, modifications of details can be made to the embodiments described and represented therein. Especially, in order to enable the operator not to hold the driving tube too high, it is possible to provide gripping members of any appropriate shape which may be located at a height convenient for the operator. Also the driving tube may be fixed to another guard-tube, the diameter of which would be larger than the diameter of the guard-tube 16 and which would slide on the latter.

What I claim is:

1. A washing apparatus, comprising in combination, first and second elongated partially telescoped tubes each of which has an outer free end; agitating means mounted on said first telescoped tube at said free end thereof; first spring means engaging said tubes for urging said second telescoped tube in a direction away from said free end of said first telescoped tube; second spring means connected to said second telescoped tube adjacent said free end thereof and supporting the same; weight means mounted on one of said tubes for movement therealong; and third spring means operatively connected to said one tube and said weight means and urging the latter in a direction away from said free end of said first telescoped tube, whereby, when said second telescoped tube is moved against the action of said second spring means toward said free end of said first telescoped tube, said first spring means is compressed and said weight means stresses said third spring means.

2. A washing apparatus, comprising in combination, first and second elongated partially telescoped tubes each of which has an outer free end; agitating means mounted on said first telescoped tube at said free end thereof; first spring means engaging said tubes for urging said second telescoped tube in a direction away from said free end of said first telescoped tube; second spring means connected to said second telescoped tube adjacent said free end thereof and supporting the same; weight means mounted on one of said tubes for movement therealong; third spring means operatively connected to said one tube and said weight means and urging the latter in a direction away from said free end of said first telescoped tube, whereby, when said second telescoped tube is moved against the action of said second spring means toward said free end of said first telescoped tube, said first spring means is compressed and said weight means stresses said third spring means; and fourth spring means mounted between and engaging said telescoped tubes for urging said free end of said first telescoped tube toward said second telescoped tube.

3. A washing apparatus, comprising in combination, inner and outer elongated partially telescoped tubes each of which has an outer free end; agitating means mounted on said inner telescoped tube at said free end thereof; a first coil spring mounted about said inner tube and engaging said outer telescoped tube to urge the same in a direction away from said free end of said inner telescoped tube; a second spring connected to said outer telescoped tube adjacent said free end thereof and supporting the same; weight means mounted on said outer tube for movement therealong; a third coil spring located about said outer tube and engaging said weight means on one side thereof to urge the latter in a direction away from said free end of said inner telescoped tube, whereby, when said outer telescoped tube is moved against the action of said second spring toward said free end of said inner telescoped tube, said first spring is compressed and said weight means stresses said third spring; a fourth coil spring mounted between said telescoped tubes and engaging said inner tube for urging said free end of said inner telescoped tube toward said outer telescoped tube; and shoulder means mounted on said outer tube on the other side of said weight means from said third spring for limiting the movement of said weight means in said direction away from said free end of said inner telescoped tube.

4. A washing apparatus, comprising in combination, inner and outer elongated partially telescoped tubes each of which has an outer free end; agitating means mounted on said inner telescoped tube at said free end thereof; a first coil spring located about said inner tube and engaging said outer tube for urging said outer telescoped tube in a direction away from said free end of said first telescoped tube; a second spring connected to said outer telescoped tube adjacent said free end thereof and supporting the same; weight means mounted on said outer tube for movement therealong; a third coil spring located about said outer tube on one side of and in engagement with said weight means to urge the latter in a direction away from said free end of said inner telescoped tube, a fourth coil spring located about said inner tube between and engaging said telescoped tubes for urging said free end of said inner telescoped tube toward said outer telescoped tube; shoulder means mounted on said outer of said tubes on the other side of said weight means from said third spring for limiting the movement of said weight means in said direction away from said free end of said inner telescoped tube; and pressure means mounted on said inner telescoped tube for damping the movement of said outer telescoped tube toward said free end of said inner telescoped tube.

5. A washing apparatus, comprising in combination, inner and outer elongated partially telescoped tubes each of which has an outer free end; agitating means mounted on said inner telescoped tube at said free end thereof; a first coil spring located about said inner tube and engaging said outer tube for urging the latter in a direction away from said free end of said inner telescoped tube; a second spring connected to said outer telescoped tube adjacent said free end thereof and supporting the same; weight means mounted on said outer tubes for movement therealong; a third coil spring located about said outer tube on one side of and in engagement with said weight means to urge the latter in a direction away from said free end of said inner telescoped tube, a fourth coil spring located about said inner tube between and in engagement with said telescoped tubes for urging said free end of said inner telescoped tube toward said outer telescoped tube; shoulder means mounted on said outer tube on the other side of said weight means from said third spring for limiting the movement of said weight means in said direction away from said free end of said inner telescoped tube; first pressure means mounted on said inner telescoped tube for damping the movement of said outer telescoped tube toward said free end of said inner telescoped tube; and second pressure means associated with said third spring for damping the movement of said weight means toward said free end of said inner telescoped tube.

6. A washing apparatus, comprising in combination, inner and outer elongated partially telescoped tubes each of which has an outer free end; agitating means mounted on said inner telescoped tube at said free end thereof; a first coil spring located about said inner tube and engaging said outer tube for urging said outer telescoped tube in a direction away from said free end of said inner telescoped tube; a second spring connected to said outer telescoped tube adjacent said free end thereof and supporting the same; weight means mounted on said outer tube for movement therealong; a third coil spring located about said outer tube on one side of and in engagement with said weight means to urge the latter in a direction away from said free end of said inner telescoped tube, a fourth coil spring located about said inner tube between and in engagement with said telescoped tubes for urging said free end of said inner telescoped tube toward said outer telescoped tube; shoulder means mounted on said outer tube on the other side of said weight means from said third spring for limiting the movement of said weight means in said direction away from said free end of said inner telescoped tube; first pressure means mounted on said inner telescoped tube for damping the movement of said outer telescoped tube toward said free end of said inner telescoped tube; second pressure means associated with said third spring for damping the movement of said weight means toward said free end of said inner telescoped tube; and handle means mounted on said outer telescoped tube to facilitate the operation of the washing apparatus by the user.

7. A washing apparatus, comprising in combination, inner and outer elongated partially telescoped tubes each of which has an outer free end; agitating means mounted on said inner telescoped tube at said free end thereof and comprising an outer frusto-conical member and an inner conical member fixedly connected to and located within said outer frusto-conical member and being inverted with respect to the same; a first coil spring located about said inner tube and engaging said outer tube for urging said outer telescoped tube in a direction away from said free end of said inner telescoped tube; a second spring connected to said outer telescoped tube adjacent said free end thereof and supporting the same; weight means mounted on said outer tube for movement therealong; a third coil spring located about said outer tube on one side of and in engagement with said weight means and urging the latter in a direction away from said free end of said first telescoped tube, a fourth coil spring located about said inner tube between and in engagement with said telescoped tubes for urging said free end of said inner telescoped tube toward said outer telescoped tube; shoulder means mounted on said outer tube on the other side of said weight means from said third spring for limiting the movement of said weight means in said direction away from said free end of said inner telescoped tube; first pressure means mounted on said inner telescoped tube for damping the movement of said outer telescoped tube toward said free end of said inner telescoped tube; second pressure means associated with said third spring for damping the movement of said weight means toward said free end of said inner telescoped tube; and handle means mounted on said outer telescoped tube to facilitate the operation of the washing apparatus by the user.

References Cited in the file of this patent

UNITED STATES PATENTS

| Number | Name | Date |
|---|---|---|
| 204,101 | Smith | May 21, 1878 |
| 328,811 | Rigby | Oct. 20, 1885 |
| 378,711 | Nelson | Feb. 28, 1888 |
| 1,802,034 | Perks | Apr. 21, 1931 |

FOREIGN PATENTS

| Number | Country | Date |
|---|---|---|
| 21,650 | Great Britain | of 1900 |